United States Patent
Sato et al.

(10) Patent No.: US 9,459,093 B2
(45) Date of Patent: Oct. 4, 2016

(54) DEFLECTION MEASURING DEVICE AND DEFLECTION MEASURING METHOD

(71) Applicant: Kabushiki Kaisha Toshiba, Minato-ku (JP)

(72) Inventors: Hidenori Sato, Yokohama (JP); Nobuhiro Komine, Nagoya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 153 days.

(21) Appl. No.: 14/296,638

(22) Filed: Jun. 5, 2014

(65) Prior Publication Data

US 2015/0233706 A1    Aug. 20, 2015

Related U.S. Application Data

(60) Provisional application No. 61/942,429, filed on Feb. 20, 2014.

(51) Int. Cl.
*G01B 11/16* (2006.01)
*G01B 11/24* (2006.01)

(52) U.S. Cl.
CPC ............ *G01B 11/16* (2013.01); *G01B 11/161* (2013.01); *G01B 11/165* (2013.01); *G01B 11/24* (2013.01); *G01B 11/2441* (2013.01)

(58) Field of Classification Search
None
See application file for complete search history.

(56) References Cited

U.S. PATENT DOCUMENTS

| | | | |
|---|---|---|---|
| 6,842,247 B1 * | 1/2005 | Wehrens | G03F 7/705 356/400 |
| 7,710,583 B2 | 5/2010 | Kono | |
| 7,740,992 B2 | 6/2010 | Inao et al. | |
| 7,990,543 B1 * | 8/2011 | Mello | G01B 11/2441 356/512 |
| 2011/0299064 A1 * | 12/2011 | Sugimoto | G01B 11/162 356/35.5 |

FOREIGN PATENT DOCUMENTS

| | | | |
|---|---|---|---|
| GB | 2008791 A | * | 6/1979 |
| JP | 4253773 | | 4/2009 |
| JP | 4522166 | | 8/2010 |
| JP | 4846510 | | 12/2011 |

OTHER PUBLICATIONS

Kazuo Arakawa et al. "Measurement of Displacement Fields by Moire Interferometry (Application to Thermal Deformation Analysis of IC Packages)", Proceedings of JSEM Annual Conference on Experimental Mechanics, 2001, 5 pages ( with partial translation of pp. 1 & 2).

* cited by examiner

Primary Examiner — Gordon J Stock, Jr.
(74) Attorney, Agent, or Firm — Oblon, McClelland, Maier & Neustadt, L.L.P.

(57) ABSTRACT

According to one embodiment, a deflection measuring device that irradiates an effective region of a pattern transfer plate on which a pattern is formed, with parallel lights from at least two directions, and detects interference fringes of the parallel lights reflected from the effective region.

19 Claims, 7 Drawing Sheets

DEFLECTION MEASURING DEVICE AND DEFLECTION MEASURING METHOD

CROSS-REFERENCE TO RELATED APPLICATIONS

This application is based upon and claims the benefit of priority from Provisional Patent Application No. 61/942429, filed on Feb. 20, 2014; the entire contents of which are incorporated herein by reference.

FIELD

Embodiments described herein relate generally to a deflection measuring device and a deflection measuring method.

BACKGROUND

In a process for manufacturing a semiconductor apparatus including a large number of various semiconductor elements such as transistors, a technique for achieving finer patterns is essential for enhancement of an integration degree. In these days, there has been advanced strenuous development of lithography technique for further finer patterns. If a photomask for use in a lithographic process has deflection, the deflection causes defocusing on a wafer, and thus photomask deflection control is important.

DETAILED DESCRIPTION

In general, according to one embodiment, a deflection measuring device radiates parallel lights from at least two directions to an effective region of a pattern transfer plate on which a pattern is formed, and detects interference fringes of the parallel lights reflected from the effective region.

Exemplary embodiments of a deflection measuring device and a deflection measuring method will be explained below in detail with reference to the accompanying drawings. The present invention is not limited to the following embodiments.

(First Embodiment)

Figure 1:
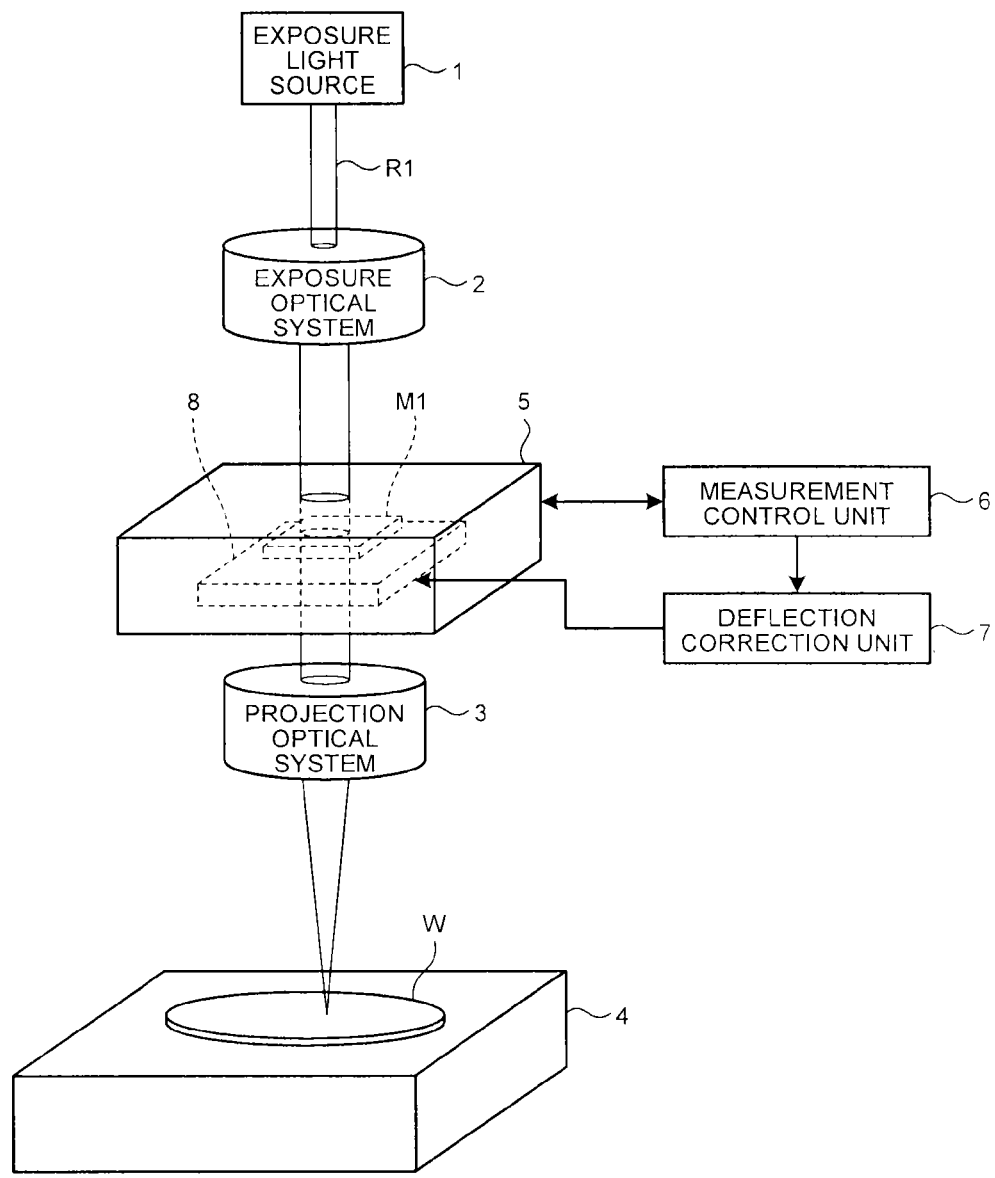
FIG. 1 is a schematic perspective diagram of an optical exposure apparatus to which a deflection measuring device according to a first embodiment is applied.

FIG. 1 is a schematic perspective diagram of an optical exposure apparatus to which a deflection measuring device according to a first embodiment is applied.

Referring to FIG. 1, the optical exposure apparatus includes an exposure light source 1, an exposure optical system 2, a projection optical system 3, a wafer stage 4, and a deflection measuring device 5, a measurement control unit 6, a deflection correction part 7, and a mask stage 8.

The exposure light source 1 generates exposure light R1. The exposure light R1 may be ultraviolet light, for example. The exposure optical system 2 guides the exposure light R1 to the projection optical system 3 via a photomask M1. The projection optical system 3 projects the exposure light R1 having passed through the photomask M1 onto a wafer W. The wafer stage 4 holds the wafer W. The wafer stage 4 is capable of moving in X-axis, Y-axis, and Z-axis directions. The wafer stage 4 is also capable of inclining with respect to the X-axis direction. The deflection measuring device 5 is capable of measuring deflection in the photomask M1. The measurement control unit 6 is capable of controlling measurement of deflection in the photomask M1. The deflection correction part 7 is capable of correcting the deflection in the photomask MT based on results of the measurement of deflection in the photomask M1. The mask stage 8 holds the photomask M1. The mask stage 8 is capable of causing distortion in the photomask M1 by twisting or pulling the photomask M1, or applying local pressure to the photomask M1.

Figure 2A:
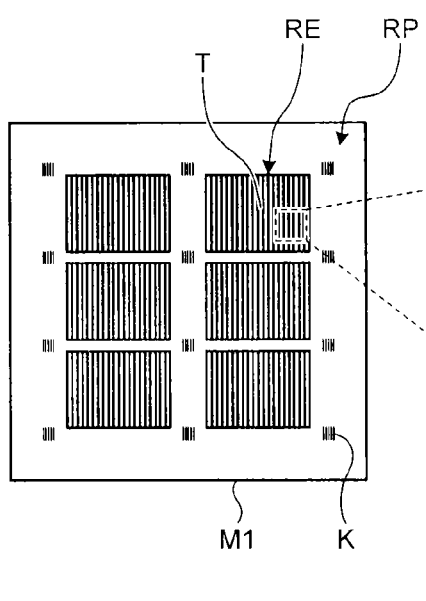
FIG. 2A is a plane view of one example of a mask pattern of a photomask to which deflection measurement is applied.
Figure 2B:
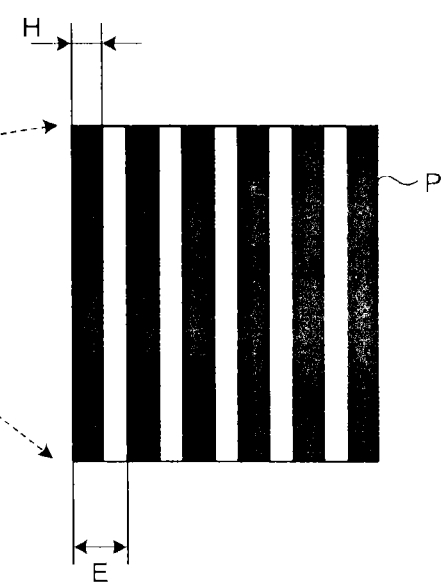
FIG. 2B is an enlarged plane view of a part of the mask pattern illustrated in FIG. 2A.

FIG. 2A is a plane view of one example of a mask pattern of a photomask to which deflection measurement is applied, and FIG. 2B is an enlarged plane view of a part of the mask pattern illustrated in FIG. 2A.

Referring to FIG. 2A, the photomask M1 is provided with an effective region RE and a periphery region RP. A mask pattern T as a constitutional element of a device can be formed in the effective region RE. The mask pattern formed in the effective region RE is incorporated into the device. Reference marks K such as an alignment mark, a position shift measurement mark, and the like can be formed in the periphery region RP. The periphery region RP may be a kerf region. A mask pattern not as a constitutional element of the device can be formed in the periphery region RP. The mask pattern formed in the periphery region RP is referred to at manufacture of the device but is not incorporated into the device. The device may have as a constitutional element a cyclic pattern such as an NAND-type flash memory, for example. The constitutional element of the device may be bit lines, word lines, active regions, and the like of an NAND-type flash memory, for example. Here, the mask pattern T in the effective region RE can be formed by lines and spaces. Pitch E of the line and space may be set to 1000 nm, for example, and width H of the line may be set to 500 nm, for example.

When exposing the wafer W surface, the wafer W is held on the wafer stage 4. Before the exposure, a resist film may be formed on the entire wafer W surface. In addition, the photomask M1 is held on the mask stage 8.

Then, when the exposure light R1 enters the exposure optical system 2, the exposure light R1 is guided to the projection optical system 3 via the photomask M1. The exposure light R1 is then projected via the projection optical system 3 onto the wafer W. If the deflection measuring device 5 is a hindrance to passage of the exposure light R1, the deflection measuring device 5 may be removed so as not to hinder passage of the exposure light R1.

Before the exposure, the deflection measuring device 5 is capable of measuring deflection in the photomask M1. At that time, the deflection measuring device 5 detects deflection in the photomask M1 by detecting interference fringes of parallel lights reflected from the effective region RE of the photomask M1. When deflection is detected in the photomask M1, the photomask M1 can be distorted on the mask stage 8 to reduce the deflection in the photomask M1.

Figure 3:
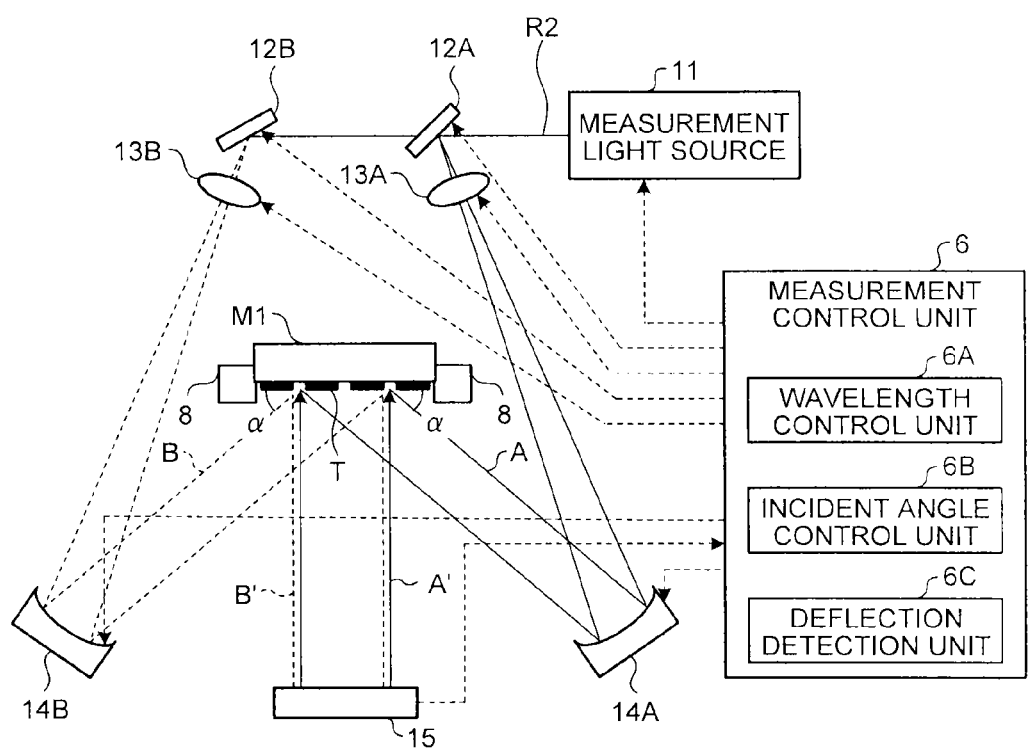
FIG. 3 is a schematic cross-sectional view of a deflection measuring device according to the first embodiment.

FIG. 3 is a schematic cross-sectional view of a deflection measuring device according to the first embodiment.

Referring to FIG. 3, the deflection measuring device 5 includes a measurement light source 11, a beam splitter 12A, a reflection mirror 12B, spatial filters 13A and 13B, paraboloidal mirrors 14A and 14B, and a detector 15. The measurement light source 11 is capable of generating measurement light R2. The measurement light R2 may be an HeNe laser with a wavelength of 632 nm, for example. The beam splitter 12A splits a measurement light R2. The reflection mirror 12B changes a light path of the split measurement light R2. The spatial filters 13A and 13B expand the split measurement light R2. The paraboloidal mirrors 14A and 14B convert the split measurement light R2 into parallel lights A and B. The beam splitter 12A, the reflection mirror 12B, the spatial filters 13A and 13B and the paraboloidal mirrors 14A and 14B can be adjusted in angle. The detector 15 may be an imaging element such as a CCD, a CMOS sensor, or the like to observe an image in a two-dimensional manner.

The measurement control unit 6 includes a wavelength control unit 6A, an incident angle control unit 6B, and a deflection detection unit 6C. The wavelength control unit 6A is capable of controlling wavelengths of the parallel lights A and B according to the size of the mask pattern T. The incident angle control unit 6B is capable of controlling incident angle a of the parallel lights A and B according to the size of the mask pattern T. The deflection detection unit 6C is capable of detecting deflection in the photomask M1 based on results of the detection of interference fringes of parallel lights A' and B' reflected from the effective region RE of the photomask M1.

When the mask pattern T has lines and spaces, the mask pattern T can be sized with the pitch E in the lines and spaces. In addition, assuming that the size of the mask pattern T is designated as P, the wavelength of the parallel lights A and B as $\lambda$, the incident angle of the parallel lights A and B as $\alpha$, the following relationship can be met:

$$P \sin(\alpha) = m\lambda \text{ (where } m \text{ is an integer)} \quad (1)$$

Then, the wavelength $\lambda$ of the parallel lights A and B is set so as to meet the relationship in equation (1) by controlling the wavelength of the measurement light source 11 at the wavelength control unit 6A. Otherwise, the incident angle $\alpha$ of the parallel lights A and B is set so as to meet the relationship in equation (1) by adjusting the angles of the beam splitter 12A, the reflection mirror 12B, the spatial filters 13A and 13B, and the paraboloidal mirrors 14A and 14B at the incident angle control unit 6B.

Then, the measurement light R2 generated from the measurement light source 11 is split by the beam splitter 12A, and entered into the paraboloidal mirror 14A via the spatial filter 13A, thereby generating the parallel light A. In addition, the measurement light R2 split by the beam splitter 12A is reflected on the reflection mirror 12B, and entered into the paraboloidal mirror 14B via the spatial filter 13B, thereby generating the parallel light B. Then, the parallel lights A and B enter the effective region RE of the photomask M1 at the incident angle $\alpha$ from different directions, and the parallel lights A' and B' reflected from the effective region RE enter the detector 15. Then, the parallel lights A' and B' interfere with each other according to the deflection in the photomask M1 to generate interference fringes, and the interference fringes are detected by the detector 15. Results of the detection by the detector 15 are sent to the deflection detection unit 6C, and the deflection in the photomask M1 is detected based on results of the detection of the interference fringes of the parallel lights A' and B'.

The measurement light source 11, the beam splitter 12A, the reflection mirror 12B, the spatial filters 13A and 13B, and the paraboloidal mirrors 14A and 14B can be arranged so as to avoid the light path of the exposure light R1 illustrated in FIG. 1. In addition, when the detector 15 is positioned on the light path of the exposure light R1 illustrated in FIG. 1, the detector 15 may be removed from the light path of the exposure light R1 at the time of exposure. Further, the parallel lights A' and B' may be first-order diffraction lights or high-order diffraction lights.

Figure 4A:
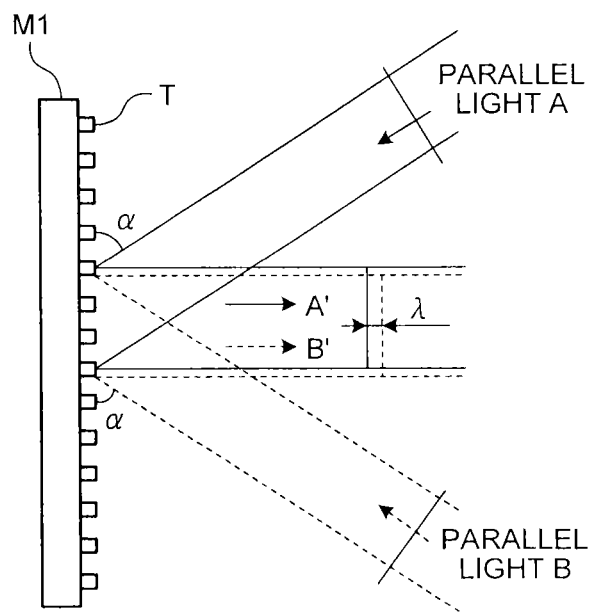
FIG. 4A is a cross-sectional view of a light path of laser light with no deflection in the photomask, and Jig. 4B is a cross-sectional view of a light path of laser light with deflection in the photomask.
Figure 4B:
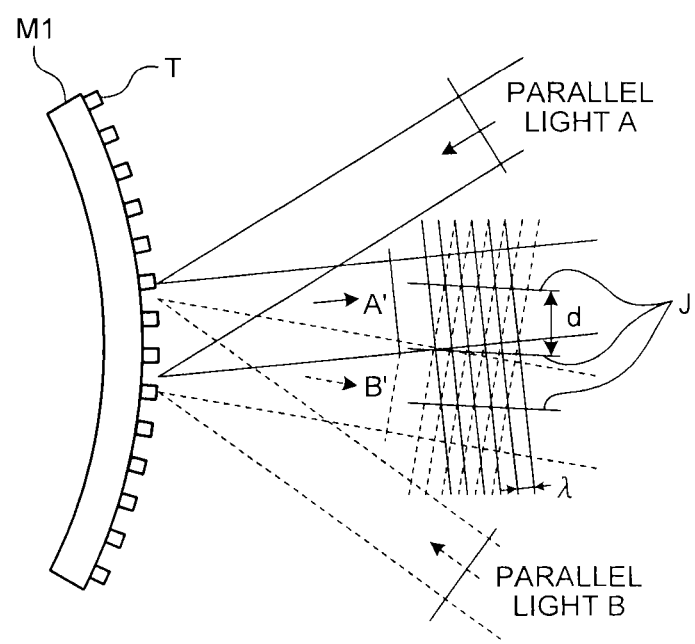

FIG. 4A is a cross-sectional view of a light path of laser light with no deflection in the photomask, and FIG. 4B is a cross-sectional view of a light path of laser light with deflection in the photomask.

Referring to FIG. 4A, when there is no deflection in the photomask Ml, the parallel lights A' and B' are planar waves parallel to the surface of the photomask M1. Accordingly, the parallel lights A' and B' do not interfere with each other and thus do not generate interference fringes.

Meanwhile, referring to FIG. 4B, when there is deflection in the photomask M1, the spatial frequency of the mask pattern T changes. Accordingly, the parallel lights A' and B' differ from each other in angle of planar wave, and the parallel lights A' and B' interfere with each other to generate interference fringes J with wavelength d.

By detecting deflection in the photomask M1 based on results of detection of the interference fringes of the parallel lights A' and B' reflected from the effective region RE of the photomask M1, it is possible to expand a placement region for the pattern generating interference fringes, as compared to a method by which a diffraction pattern generating interference fringes is provided in the periphery region RP. This makes it possible to improve the resolution of detection of interference fringes and thus increase the accuracy of measurement of deflection in the photomask M1.

(Second Embodiment)

Figure 5:
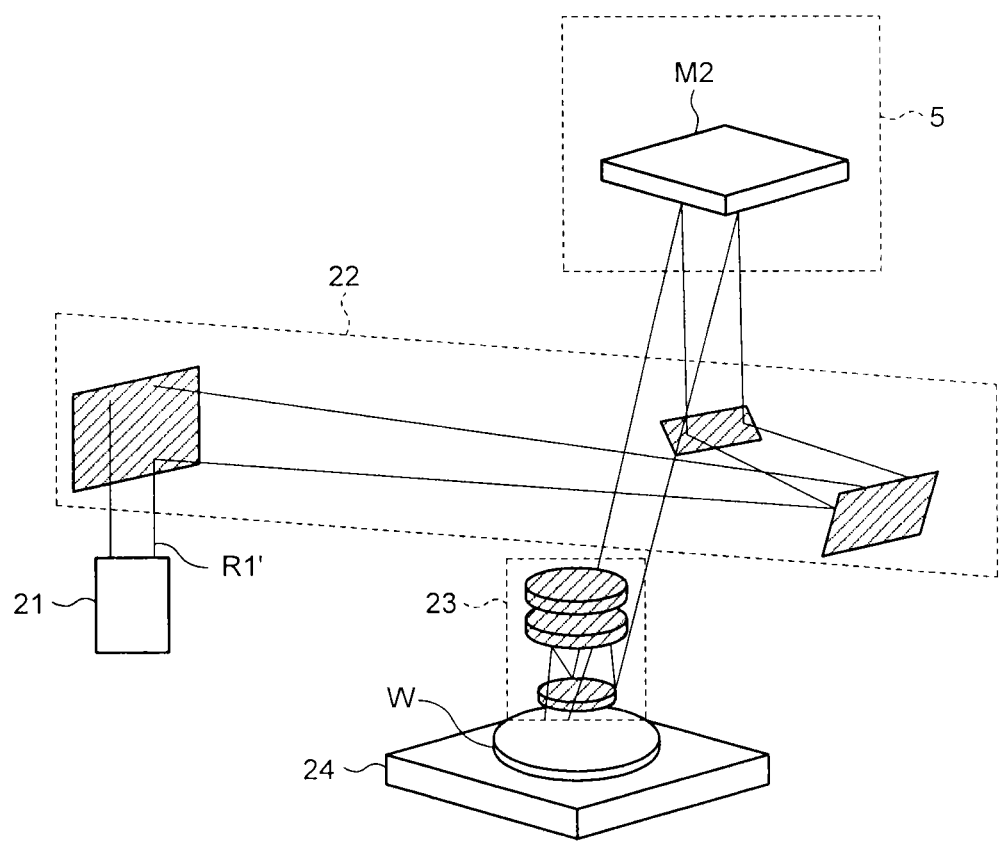
FIG. 5 is a schematic perspective diagram of an EUV exposure apparatus to which a deflection measuring device according to a second embodiment is applied.

FIG. 5 is a schematic perspective diagram of an EUV (extreme ultra violet) exposure apparatus to which a deflection measuring device according to a second embodiment is applied.

Referring to FIG. 5, the EUV exposure apparatus includes: an EUV light source 21 that generates an exposure light R1'; an illumination optical system 22 that guides the exposure light R1' emitted from the EUV light source 21 to an exposure mask M2; a projection optical system 23 that projects the exposure light R1' reflected from the exposure mask M2 onto a wafer W; a wafer stage 24 on which the wafer W is placed; and the exposure mask M2 on which a mask pattern is formed corresponding to a layout pattern projected onto the wafer W.

The wavelength of the exposure light R1' may be set to about 13 to 14 nm, for example. The exposure mask M2 may be a mirror plate for reflecting the exposure light R1', and a light absorption pattern is provided on the mirror plate to form a mask pattern. The mirror plate may use a multi-layer reflective film formed by a Mo/Si multi-layer film, for example. The light absorption pattern may be formed using a Ta-based material. The EUV exposure apparatus also includes the deflection measuring device 5. The deflection measuring device 5 may be configured in the same manner as illustrated in FIG. 3. The mask pattern on the exposure mask M2 may be configured in the same manner as illustrated in FIG. 2A.

Then, the exposure light R1' is guided to the exposure mask M2 via the illumination optical system 22. The exposure light R1' reflected on the exposure mask M2 is projected onto the wafer W via the projection optical system 23.

Before EUV exposure, deflection in the exposure mask M2 can be measured at the deflection measuring device 5. At that time, the deflection measuring device 5 detects deflection in the exposure mask M2 by detecting interference fringes of the parallel lights reflected from the effective region of the exposure mask M2.

(Third Embodiment)

Figure 6:
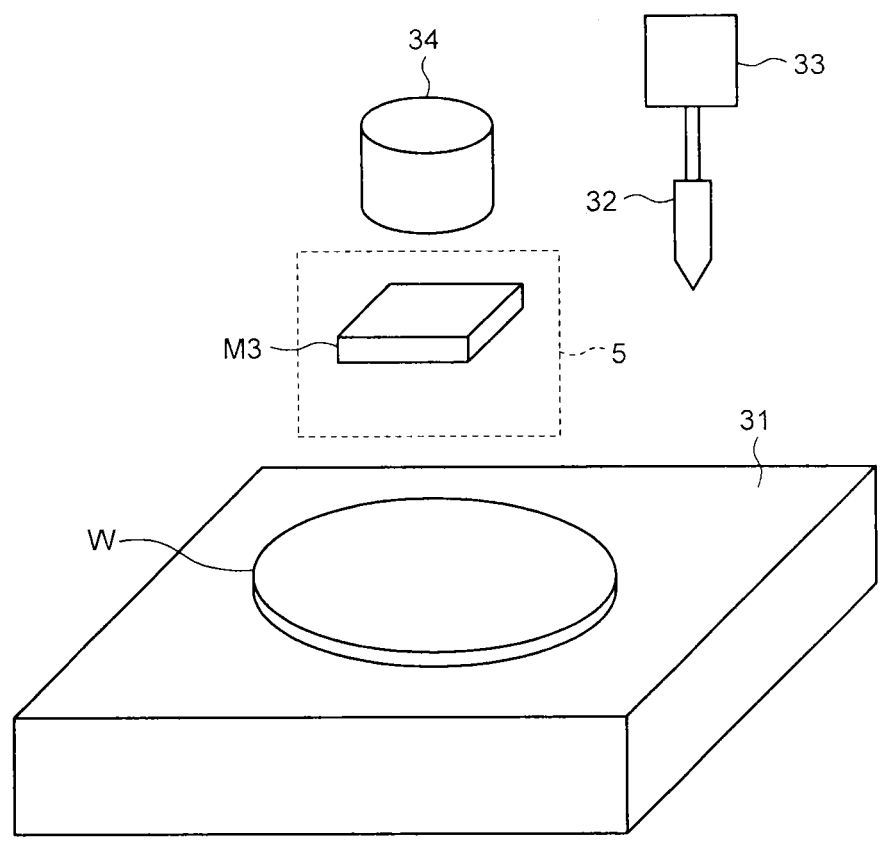
FIG. 6 is a schematic perspective diagram of a nanoimprint apparatus to which a deflection measuring device according to a third embodiment is applied.

FIG. 6 is a schematic perspective diagram of a nanoimprint apparatus to which a deflection measuring device according to a third embodiment is applied.

The nanoimprint apparatus includes: a stage 31 that holds the wafer W; a nozzle 32 that discharges an imprint material onto the wafer W; an ultraviolet irradiation device 34 that irradiates the imprint material on the wafer W with an ultraviolet ray; and a template M3 for use in imprint. The nozzle 32 is connected to a tank 33 storing the imprint material. The nanoimprint apparatus also includes the deflection measuring device 5. The deflection measuring device 5 may be configured in the same manner as illustrated in FIG. 3. The print pattern on the template M3 may be configured in the same manner as illustrated in FIG. 2A.

Then, the imprint material is applied to the wafer W via the nozzle 32. Next, the imprint material is irradiated with an ultraviolet ray via the ultraviolet irradiation device 34 while the template M3 is pressed against the imprint material, and the imprint material is cured, thereby to form an imprint pattern on the wafer W.

Before the imprint, deflection in the template M3 can be measured at the deflection measuring device 5. At that time, the deflection measuring device 5 detect deflection in the template M3 by detecting interference fringes of parallel lights reflected from the effective region of the template M3.

(Fourth Embodiment)

Figure 7:
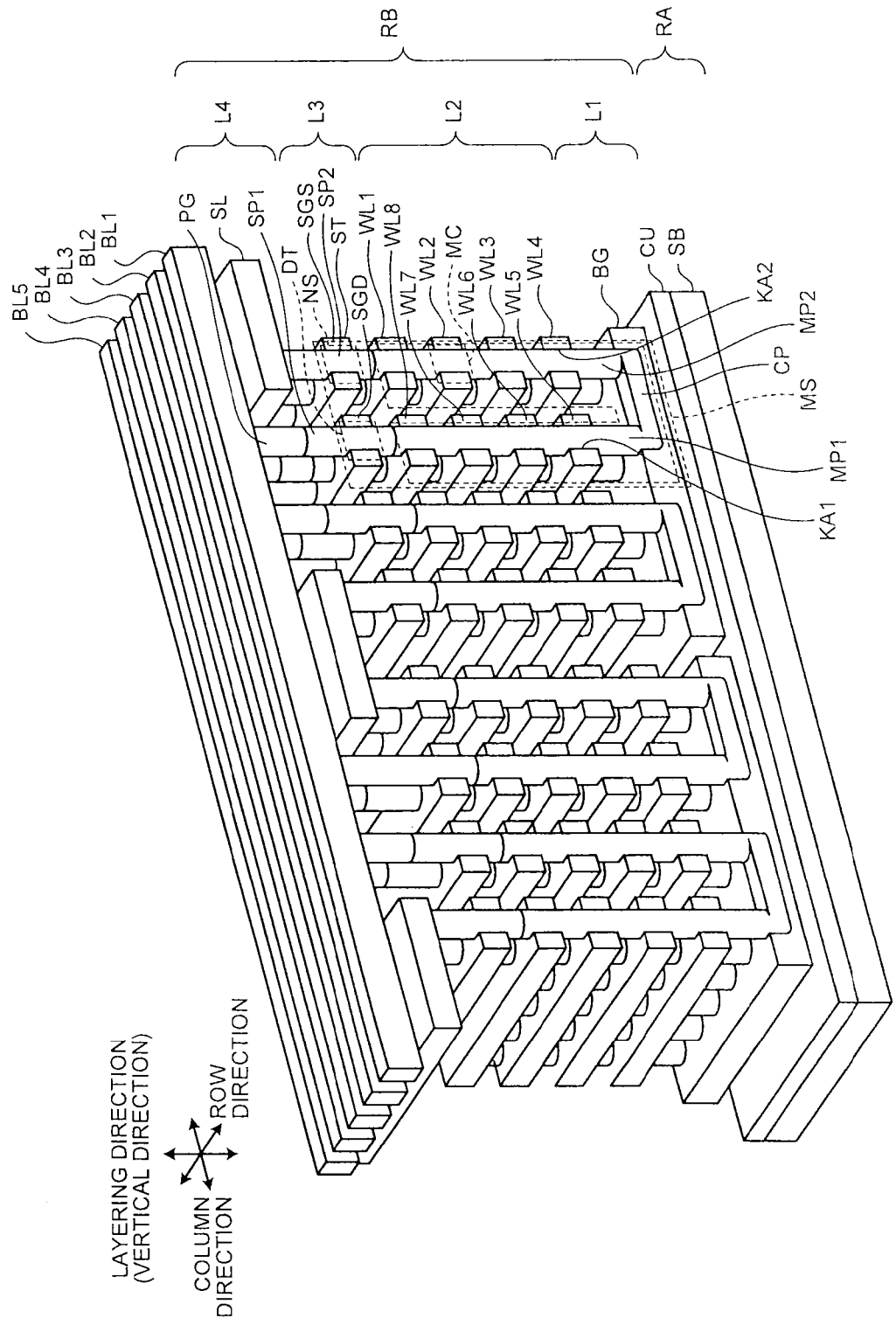
FIG. 7 is a schematic perspective diagram of a semiconductor apparatus to which a deflection measuring device according to a fourth embodiment is applied.

FIG. 7 is a schematic perspective diagram of a semiconductor apparatus to which a deflection measuring device according to a fourth embodiment is applied. In the example of FIG. 7, a memory cell array of a three-dimensional NAND flash memory is used.

Referring to FIG. 7, the memory cell array has a circuit region RA and a memory region RB. The circuit region RA is formed on a semiconductor substrate SE. The memory region RB is formed on the circuit region RA.

The memory cell array has sequentially formed on the semiconductor substrate SB, a circuit layer CU, a back-gate transistor layer L1, a memory cell transistor layer L2, a select transistor layer L3, and a wiring layer L4.

The transistor layer L1 functions as a back-gate transistor. The memory cell transistor layer L2 functions as cell transistors for memory cells MC. The select transistor layer L3 functions as select transistors ST and DT. The wiring layer L4 functions as a source line SL and bit lines BL1 to BL5.

The transistor layer L1 has a back-gate layer BG. The back-gate layer BC is extended two-dimensionally in a row direction and a column direction parallel to the semiconductor substrate SB. The back-gate layer BC is formed by polycrystalline silicon, for example.

The back-gate layer BC has a back-gate hole. The back-gate hole is formed by digging the back-gate layer BC. The back-gate hole is formed in the shape of an almost rectangle in which a longitudinal side thereof is arranged in the column direction as seen from top. A connection layer CP is formed in the back-gate hole.

The memory cell transistor layer L2 is formed on an upper layer of the transistor layer L1. The memory cell transistor layer L2 has word lines WL1 to WL8. The word lines WL1 to WL8 are layered with inter-layer insulating layers therebetween. The word lines WL1 to WL8 are formed in a striped pattern extending in the row direction with a predetermined pitch along the column direction. The word lines WL1 to WL8 are formed by polycrystalline silicon, for example.

The memory cell transistor layer L2 has memory holes KA1 and KA2. The memory holes KA1 and KA2 penetrate through the word lines WL1 to WL8. The memory holes KA1 and KA2 align with the vicinity of an end portion of the back-gate hole in the column direction. The cell transistors for the memory cells MC are connected together in series in a layering direction, and are connected to be folded back via the connection layer CP in the layering direction, thereby constituting a memory string MS.

The select transistor layer L3 has select gate lines SGS and SGD. The select gate lines SGS and SGD are formed in a stripe pattern extending in the row direction with a predetermined pitch along the column direction. A pair of select gate lines SGS and a pair of select gate lines SGD are alternately arranged in the column direction. The select gate lines SGS are formed on an upper layer of one columnar portion MP2, and the select gate lines SGD are formed on an upper layer of the other columnar portion MP1. The select gate lines SGS and SGD are formed by polycrystalline silicon.

The select transistor layer L3 has columnar portions SP1 and SP2. The columnar portions SP1 and SP2 penetrate through the select gate lines SGS and SGD, respectively. The columnar portions SP1 and SP2 are layered so as to align with the columnar portions MP1 and MP2, respectively. Select transistors ST and DT are connected in series to both ends of the memory string MS, thereby constituting an NAND string NS.

The wiring layer L4 is formed on an upper layer of the select transistor layer L3. The wiring layer L4 has a source line SL, a plug PG, and bit lines BL1 to BL5.

The source line SL is formed in the shape of a plate extending in the row direction. The source line SL is in contact with an upper surface of a pair of select gate lines SGS adjacent to each other in the column direction. The plug PG is in contact with an upper surface of the select gate line SGD and extended in a direction perpendicular to a surface of the semiconductor substrate SB. The bit lines BL1 to BL5 are formed in a stripe extending in the column direction with a predetermined pitch in the row direction. The bit lines BL1 to BL5 are formed in contact with the upper surface of the plug PG. The source line SL, the plug PG, and the bit lines BL1 to BL5 are formed by a metal such as tungsten (W), for example.

The patterns of the bit lines BL1 to BL5 and the word lines WL1 to WL8 may be formed by lines and spaces for each of the layers. By reducing the pitches with which the bit lines BL1 to BL5 and the word lines WL1 to WL8 are arranged, it is possible to improve the integration degree of the three-dimensional NAND flash memory.

Deflection in the photomask can be measured based on the lines and spaces of the photomask corresponding to the bit lines BL1 to BL5 or the word lines WL1 to WL7. Thus, it is possible to improve the resolution of detection of interference fringes resulting from deflection in the photomask, and increase the accuracy of measurement of deflection in the photomask. Accordingly, it is possible to increase the accuracy of arrangement of the bit lines BL1 to BL5 and the word lines WL1 to WL8, thereby improving the integration degree of the three-dimensional NAND flash memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A deflection measuring device, comprising:
    a light source that generates measurement light;
    a beam splitter that splits the measurement light;
    mirrors that convert the split measurement light into parallel lights and irradiate an effective region of a pattern transfer plate on which a cyclic device pattern is formed, with the parallel lights from at least two directions; and
    a detector that detects interference fringes of the parallel lights reflected simultaneously from the effective region, the interference fringes being generated based on differences from each other in angle of planar wave of the parallel lights.

2. The deflection measuring device according to claim 1, further comprising a deflection detector configured to detect deflection in the pattern transfer plate based on generation of the interference fringes.

3. The deflection measuring device according to Claim 1, wherein the cyclic device pattern is formed by lines and spaces.

4. The deflection measuring device according to claim 1, further comprising a wavelength controller configured to control wavelength of the parallel lights according to a size of the cyclic device pattern, wherein, when it is assumed that the size of the cyclic device pattern is designated as P, the wavelength of the parallel lights as $\lambda$, and the incident angle of the parallel lights as $\alpha$, the following relationship is met:

$$P \sin(\alpha) = m\lambda \text{(where } m \text{ is an integer)}.$$

5. The deflection measuring device according to claim 1, further comprising an incident angle controller configured to control an incident angle of the parallel lights according to a size of the cyclic device pattern, wherein, when it is assumed that the size of the cyclic device pattern is designated as P, the wavelength of the parallel lights as $\lambda$, and the incident angle of the parallel lights as $\alpha$, the following relationship is met:

$$P \sin(\alpha) = m\lambda \text{(where } m \text{ is an integer)}.$$

6. The deflection measuring device according to claim 1, wherein the device is applied to an optical exposure apparatus using the pattern transfer plate as a photomask.

7. The deflection measuring device according to Claim 1, wherein the device is applied to an EUV exposure apparatus using the pattern transfer plate as an exposure mask.

8. The deflection measuring device according to claim 1, wherein the device is applied to a pattern transfer apparatus that performs imprinting using the pattern transfer plate as a template.

9. The deflection measuring device according to claim 6, further comprising a mask stage that holds the photomask, wherein the mask stage deforms the photomask to reduce deflection in the photomask.

10. A deflection measuring method. comprising:
    irradiating an effective region of a pattern transfer plate on which a cyclic device pattern is formed, with parallel lights from at least two directions; and
    detecting interference fringes of the parallel lights reflected simultaneously from the effective region, the interference fringes being generated based on differences from each other in angle of planar wave of the parallel lights.

11. The deflection measuring method according to claim 10, comprising detecting deflection in the pattern transfer plate based on results of detection of the interference fringes.

12. The deflection measuring method according to claim 10, wherein the cyclic device pattern is formed by lines and spaces.

13. The deflection measuring method according to claim 10, further comprising controlling wavelength of the parallel lights according to a size of the cyclic device pattern.

14. The deflection measuring method according to claim 10, further comprising controlling an incident angle of the parallel lights according to a size of the cyclic device pattern.

15. The deflection measuring method according to claim 10, wherein, when it is assumed that the size of the pattern is designated as P, the wavelength of the parallel lights as $\lambda$, and the incident angle of the cyclic device pattern as $\alpha$, the following relationship is met:

$$P \sin(\alpha) = m\lambda \text{(where } m \text{ is an integer)}.$$

16. The deflection measuring method according to claim 10, wherein the pattern transfer plate is a photomask.

17. The deflection measuring method according to claim 10, wherein the pattern transfer plate is an exposure mask for use in EUV exposure.

18. The deflection measuring method according to claim 10, wherein the pattern transfer plate is a template for use in nanoimprint.

19. The deflection measuring method according to claim 11, further comprising deforming the pattern transfer plate to reduce the deflection, based on results of detection of the deflection.

* * * * *